April 17, 1945.                I. W. WEPPLO                2,373,867
                         LIQUID FUEL VAPORIZER
                      Filed May 12, 1944            2 Sheets-Sheet 1
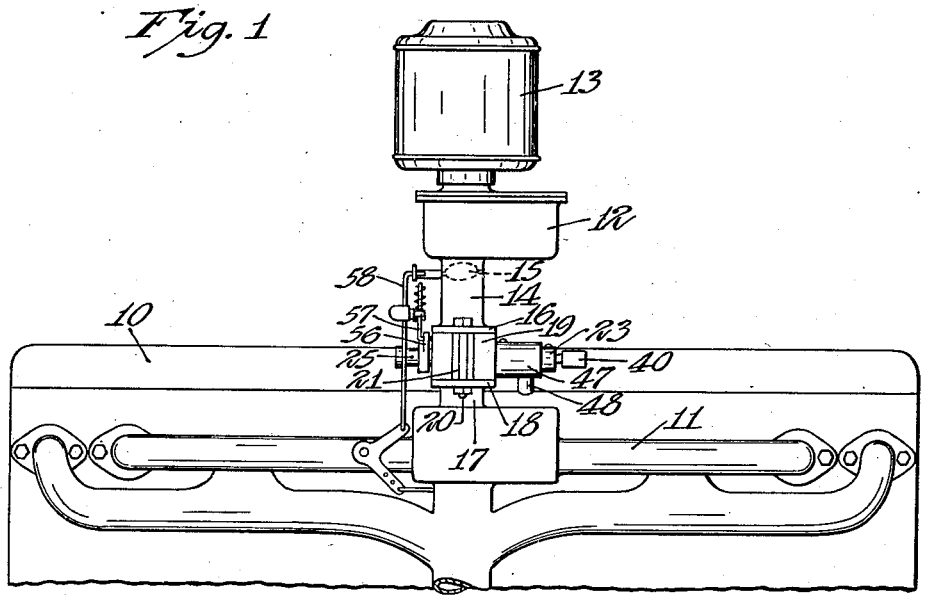
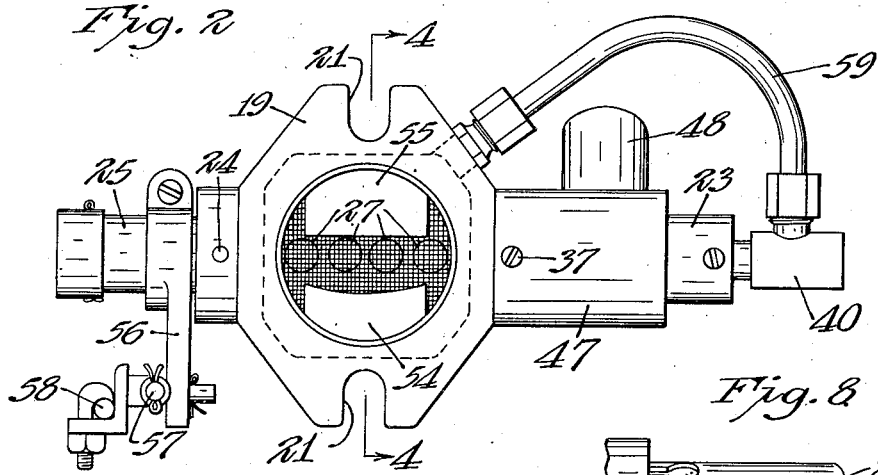
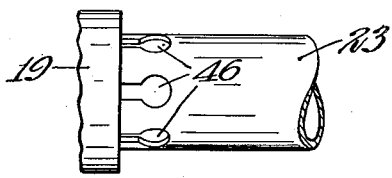
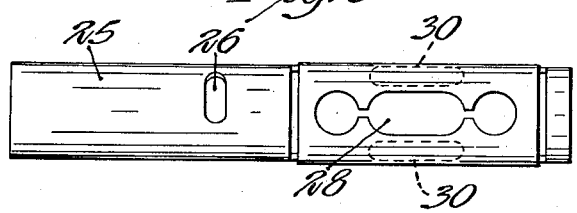
INVENTOR.
Isaac W. Wepplo
BY
Williamson & Williamson
ATTORNEYS April 17, 1945.  I. W. WEPPLO  2,373,867
LIQUID FUEL VAPORIZER
Filed May 12, 1944  2 Sheets-Sheet 2
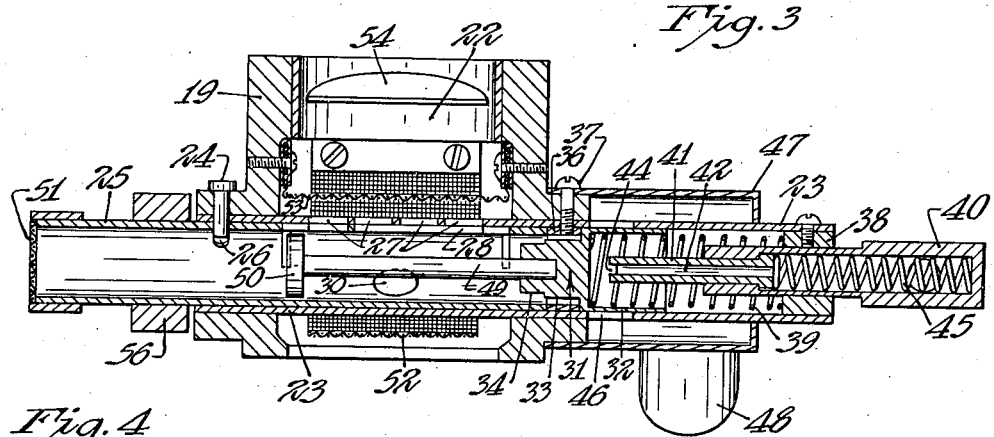
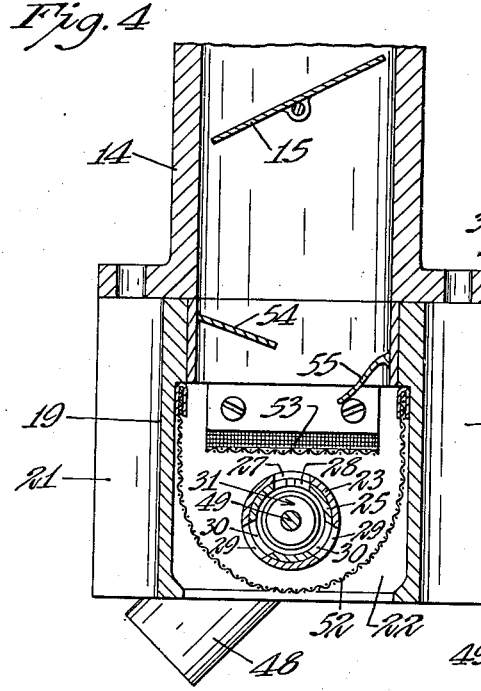
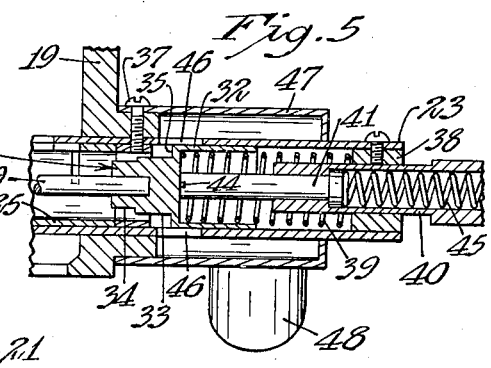
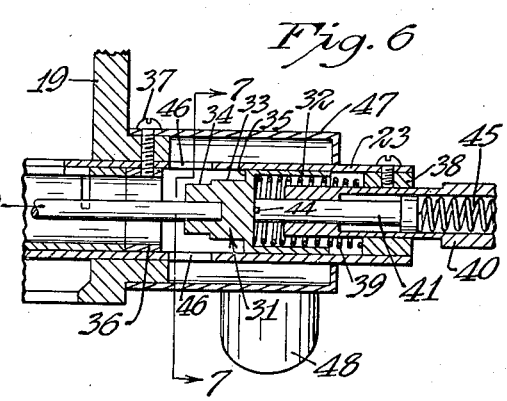
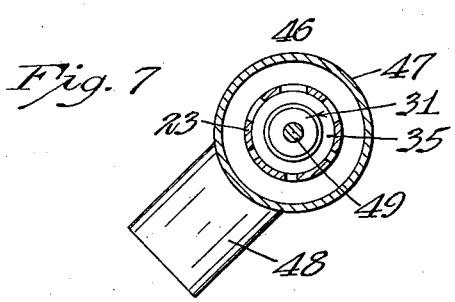
INVENTOR.
Isaac W. Wepplo
BY
Williamson & Williamson
ATTORNEYS Patented Apr. 17, 1945

2,373,867

UNITED STATES PATENT OFFICE 2,373,867

LIQUID FUEL VAPORIZER

Isaac W. Wepplo, Minneapolis, Minn.

Application May 12, 1944, Serial No. 535,293

4 Claims. (Cl. 48—180)

This invention relates to fuel vaporizers for internal combustion engines.

A general object of the invention is to provide a fuel vaporizer which will more thoroughly mix fuel and air to provide a more highly combustible and consequently more efficient fuel mixture.

Another object of the invention is to provide a fuel vaporizer having an air inlet auxiliary to the normal carburetor air inlet wherein means is provided for effectively controlling the auxiliary supply in direct response to engine intake pressures which vary in accordance with the amount or work being done by the engine.

In my prior patents, No. 2,010,973, issued August 13, 1935, entitled "Gasoline vaporizer" and No. 2,318,824, issued May 11, 1943, entitled "Fuel vaporizer" I have disclosed devices of a generally similar type. In the prior patent there is disclosed an auxiliary air control valve of ball shape and in the later patent the control valve is in the form of a generally cylindrical piston.

The present invention contemplates the use of a piston type auxiliary air control valve but the valve is formed to produce different capacities of auxiliary air flow depending upon the amount of reduced intake pressure, and I provide means for positively predetermining variations in auxiliary air flow capacity to produce the greatest efficiency in engine operation.

The above and other objects and advantages of the invention will more fully appear from the following description made in connection with the accompanying drawings, wherein like reference characters refer to the same parts throughout the views, and, in which:

Figure 1 is a side elevation of the upper portion of an internal combustion engine;

Figure 2 is an enlarged plan view of the vaporizer;

Figure 3 is a longitudinal vertical sectional view through the vaporizer;

Figure 4 is a section taken approximately on the line 4—4 of Figure 2;

Figure 5 is a fragmentary sectional view showing the control valve in an intermediate position thereof;

Figure 6 is a fragmentary sectional view showing the control valve in a completely open position;

Figure 7 is a section taken approximately on the line 7—7 of Figure 6;

Figure 8 is a fragmentary view of the auxiliary air inlet portion of the device; and Figure 9 is a plan view of one of the air flow control sleeves.

In Figure 1 there is shown the upper portion of an internal combustion engine 10 upon which is mounted an intake manifold 11 which is connected with a carburetor 12 having an air cleaner 13. The lower portion of the carburetor 12 includes a pipe 14 having a butterfly valve 15 therein. The lower end of the pipe 14 is provided with a flange 16. The central portion of the intake manifold 11 includes a short pipe section 17 having a flange 18 similar to the flange 16 at the lower end of the pipe section 14. The vaporizer body 19 is interposed between the flanges 16 and 17 and the unit is connected by nutted bolts 20 which extend through the flanges 16 and 18 and lie in notches 21 formed in the vaporizer body 19.

As best shown in Figure 3 the vaporizer body 19 defines a chamber 22 within which is mounted a stationary sleeve 23 which is secured against rotation by a pin 24, the latter being anchored in a portion of the vaporizer body 19. The sleeve 23 extends to the right through the vaporizer body and some distance outwardly therefrom.

Within the stationary sleeve 23 is mounted an inner sleeve 25 which is rotatable relative to the stationary sleeve 23, its limit of rotation being determined by a slot 26 in said sleeve 25 which is adapted to receive the pin 24 extending through the stationary sleeve 23. The stationary sleeve 23 is provided with a plurality of apertures 27 in its upper side which are adapted to register with an aperture 28 formed in the inner rotatable sleeve 25 when said latter sleeve is rotated to one of its possible positions. The outer stationary sleeve 23 is provided with lower outlet apertures 29 which are adapted to register with apertures 30 formed in the inner sleeve 25. The inner sleeve 25 can be rotated or oscillated to bring its apertures 28 and 30 into and out of registration with the apertures 27 and 29 in the stationary outer sleeve 23.

As best shown in Figures 3, 5 and 6 the stationary outer sleeve 23 has a piston 31 slidable therein, said piston having a cup-like right hand portion 32 and a pair of successively reduced portions 33 and 34. A shoulder 35 at the base of the cupped portion 32 on the piston 31 provides a seating member adapted to contact a vave seat 36 which is annular in shape and secured in the stationary outer sleeve 23 by means of a bolt 37. The reduced portions 33 and 34 on the piston 31 are adapted to fit into and extend through the valve set 36 and the larger reduced portion 33 is shown in Figures 3 and 5 to be spaced inwardly from the interior of the valve seat 36.

The right hand end of the stationary sleeve 23 is provided with an internal collar 38 and between the inner side of said collar and the bottom of the cup-shaped portion 32 of the piston 31 is a compression spring 39 which yieldably holds the piston shoulder 35 against the valve seat 36.

Extending through the collar 38 is a tubular member 40 whose left hand end has a reduced interior bore and is adapted to receive a tubular plunger 41, said plunger having an internal bore 42 therethrough, as best shown in Figure 3. The left hand end of the plunger is provided with a pair of notches 44 for a purpose to be described below. The right hand end of the tubular member 40 is closed, as best shown in Figure 3, and mounted in said member 40 in a compression spring 45 which is adapted to bear against the left hand end of the plunger 41 to yieldably hold it in the position shown in Figure 3. However, pressure against the left hand end of the plunger 41 will permit the same to move into the tubular member 40 against the pressure of the spring 45.

The stationary sleeve 23, at the point where it extends out of the vaporizer body 19, is provided with a plurality of apertures 46. A protective casing 47 surrounds the stationary sleeve 23 adjacent the openings 46 and said casing 47 is provided with a short air inlet tube 48.

Extending into the left from the piston 31 is a stem 49 and upon the left hand end of the stem is a circular head 50 which is adapted to fit the inner rotary sleeve 25 in rather closely spaced relation thereto. The left hand end of the inner sleeve 25 is open and provided with a cover screen 51 to serve as an additional air inlet for the inner sleeve 25.

The chamber 22 formed by the vaporizer body 19 is provided with an inverted U shaped screen 52 extending around and beneath the sleeves 23 and 25 and a substantially horizontal screen 53 is positioned above the sleeves 23 and 25.

At one side of the vaporizer body 19 is a baffle 54 which, as best shown in Figure 4, slants inwardly and downwardly, the slant being generally in the direction of flow of the fuel mixture from the carburetor 12. Located at the opposite side of the interior of the vaporizer body 19 from the baffle 54 is a second baffle 55 which intersects the plane of the baffle 54 and which also slants downwardly in the direction of flow of air and fuel from the carburetor 12.

The inner sleeve 25 is shown to extend outwardly to the left of the vaporizer body and to this sleeve is secured a lever 56 having a link 57 connecting it to a lever 58, the latter forming part of the throttle control mechanism. As shown in Figure 1 the throttle lever 58 is connected to the butterfly valve 15 for operation thereof.

The tubular member 40 which extends outwardly from the right hand end of the stationary outer sleeve 23 has connected thereto a piece of tubing 59 which is adapted to be connected to the intake passage and such connection may be made through the wall of the vaporizer body 19 as indicated in Figure 2 so that the device can be maintained as a more or less self-contained unit.

In my preceding patents it was explained that when the engine is idling the throttle valve 15 will be approximately in the position shown in Figure 4. At such position of the throttle valve the inner sleeve 25 will be turned to bring its openings 28 and 30 out of registration with the openings 27 and 29 in the stationary outer sleeve 23. Consequently, there is no flow communication between the interior of the inner sleeve 25 and the interior of the chamber 22 in the vaporizer body 19, said chamber 22 forming a part of the intake flow passage from the carburetor into the intake manifold 11. The piston 31 will then be in the position shown in Figure 3 with the auxiliary air inlet opening 46 closed by said piston since it is then in contact with the valve seat 36 in the interior of the stationary tube 23.

When the throttle or butterfly valve 15 is opened by actuation of the accelerator panel the inner sleeve 25 will be rotated to a proportionate degree and bring the complementary openings of the outer sleeves 23 and 25 into partial registration. If the engine is picking up speed or is laboring under an initial load there will be a relatively low vacuum in the intake manifold and the intake suction through the conduit 59 and plunger 42 will cause the piston 31 to move slightly to the right against the action of the compression spring 39. This will place the piston 31 in approximately the position shown in Figure 5. In such position the shoulder 35 on the piston 31 is shown spaced from the valve seat 36 and the piston portion 33 will admit a flow of air through the auxiliary intake 48 and inlet opening 46 past the valve seat and piston and into the inner sleeve 25. Air is then exhausted from the sleeve 25 through its openings 28 and 30 and through the openings 27 and 29 in the outer sleeve 23 so that a blast of air is directed into the mixture of air and fuel coming down past the butterfly valve 15. When the engine has increased in speed and the burden on the engine has been somewhat relieved the pressure in the intake manifold will be reduced and the increased reduction of pressure will cause the piston 31 to push the plunger 41 to the right against the action of the smaller compression spring 45. An extreme position under high vacuum conditions in the intake manifold is indicated in Figure 6 where the piston 31 has moved entirely away from and out of the annular valve seat 36, thus leaving a practically unobstructed air flow passage from the auxiliary air intake 48 through the inlet openings 46 and thence through the inner sleeve 25. From there, of course, the air continues to flow into the chamber 22 for a high pressure agitation and mixture with the fuel and air passing downwardly from the carburetor.

The two diameters of the head portion of the piston 31, functioning as described above, provide low and high pressure vacuum adjustments to properly control the incoming flow of auxiliary air through the auxiliary intake 48. Under normal conditions of placing the vehicle in motion the piston will move only until it contacts the left hand end of the plunger 41 and admit only a limited amount of auxiliary air. If too much air is admitted at this time the mixture will become too lean. However, when the vehicle has picked up speed and the load on the engine is decreased the intake pressure will drop and admit more air with the smaller diameter of the piston 31 lying concentrically inwardly of the valve seat 36. It is this variable stage positioning of the piston 41 to produce a reduced and then an increased auxiliary air flow as the vacuum in the intake manifold increases which distinguishes the present invention from the structure disclosed in my prior Patent No. 2,318,824. In combination with the two diameters of the piston the springs 39 and 45 function to provide a definite line of demarcation between the setting of what I term the low vacuum position and the high vacuum position.

The screens 52 and 53 which are shown in the chamber 22 were also disclosed in my above mentioned prior patent as well as the head 50 on the stem 49 which is adapted to admit additional air from the left hand air inlet 51 when there is a high vacuum in the intake manifold.

Attention is called to the baffles 54 and 55 in the upper portion of the vaporizer body 19. As viewed in Figure 4 the throttle or butterfly valve 15 will swing in a counterclockwise direction as it opens. This causes the majority of the air and partially vaporized liquid fuel to pass down the left hand side of the pipe 15 as viewed in Figure 4 so that it will be directed against the baffle 54. The air is traveling at a greater rate than the small droplets of liquid. The liquid will strike the baffle 54 and glance outwardly to the right whereupon it will be picked up by the faster moving stream of air and thrown against the lower baffle 55 with considerable velocity. These baffles in addition to the screens 52 and 53 assist materially in breaking up the liquid into even finer droplets or particles so that there will be a highly efficient and complete vaporization and mixture of the liquid fuel with the air coming downward from the carburetor and the auxiliary air which is directed outwardly into the chamber 22 through the stationary sleeve outlets 27 and 29.

It will, of course, be understood that various changes may be made in the form, details, arrangement and proportions of the various parts without departing from the scope of my invention.

What I claim is:

1. A fuel vaporizer for internal combustion engines adapted for use in the intake passage of the engine between the carburetor and the intake manifold thereof comprising, a casing providing a chamber to be located between said carburetor and intake manifold and having an inlet and an outlet adapted for communication with said carburetor and manifold respectively, a sleeve extending into said chamber and having an air outlet aperture communicating with the interior of said chamber and also having an air inlet exteriorly of said chamber and in communication with said sleeve outlet, a valve seat in said sleeve between said inlet and outlet, a valve in said sleeve movable toward and away from said seat to increase and decrease air flow past said valve, a first spring yieldably urging said valve toward said seat during initial movement of said valve from said seat, a second spring movable by said valve upon predetermined movement of the valve, and a reduced pressure operating connection to said valve, said operating connection being adapted for connection with reduced pressure in said intake of said engine to move said valve against said springs.

2. The structure in claim 1 and said seat being annular, said valve having a seat engaging portion and a plug portion, the latter extending into said seat portion, and said plug portion having portions of different diameters to vary the air flow capacity of said valve in different positions thereof.

3. The structure in claim 1 and said sleeve being annular in shape, said valve having a seat engaging portion and a plug portion extending into said seat portion, said plug portion having portions of different diameters to vary the air flow capacity of said valve in different positions thereof, and said plug portion being smaller at its end remote from its seat engaging portion.

4. A fuel vaporizer for internal combustion engines adapted for use in the intake passage of the engine between the carburetor and the intake manifold thereof comprising, a casing providing a chamber to be located between said carburetor and said intake manifold and having an inlet and an outlet adapted for communication with said carburetor and manifold respectively, a sleeve extending into said chamber and having an air outlet aperture communicating with the interior of said chamber and also having an air inlet exteriorly of said chamber and in communication with said sleeve outlet, a valve seat in said sleeve between said inlet and outlet, a valve in said sleeve movable toward and away from said seat to increase and decrease air flow past said valve, readily yieldable spring means urging said valve toward said seat during initial movement of said valve from said seat, less readily yieldable spring means movable by said valve upon predetermined movement of the valve, and a reduced pressure operating connection to said valve, said operating connection being adapted for connection with reduced pressure in said intake of said engine to move said valve against said spring means.

ISAAC W. WEPPLO.